(12) United States Patent
Shibanuma et al.

(10) Patent No.: US 9,758,709 B2
(45) Date of Patent: Sep. 12, 2017

(54) REFRIGERANT COMPOSITION COMPRISING DIFLUOROMETHANE (HFC32) AND 2,3,3,3-TETRAFLUOROPROPENE (HFO1234YF)

(71) Applicant: DAIKIN INDUSTRIES, LTD., Osaka (JP)

(72) Inventors: Takashi Shibanuma, Settsu (JP); Yasufu Yamada, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/955,421

(22) Filed: Jul. 31, 2013

(65) Prior Publication Data
US 2013/0312446 A1    Nov. 28, 2013

Related U.S. Application Data

(62) Division of application No. 13/508,575, filed as application No. PCT/JP2011/052194 on Jan. 27, 2011, now abandoned.

(60) Provisional application No. 61/282,344, filed on Jan. 27, 2010.

(51) Int. Cl.
 *F25B 9/00* (2006.01)
 *C09K 5/04* (2006.01)

(52) U.S. Cl.
 CPC .............. *C09K 5/045* (2013.01); *F25B 9/006* (2013.01); *C09K 2205/126* (2013.01); *C09K 2205/22* (2013.01); *F25B 2400/121* (2013.01); *Y02P 20/124* (2015.11)

(58) Field of Classification Search
 CPC ....................................................... F25B 9/006
 USPC .......................... 62/467, 498; 252/67, 68, 69
 See application file for complete search history.

(56) References Cited

U.S. PATENT DOCUMENTS

| | | | |
|---|---|---|---|
| 6,503,417 B1 | 1/2003 | Bivens et al. | |
| 8,075,796 B2 | 12/2011 | Rao et al. | |
| 2006/0243944 A1 | 11/2006 | Minor et al. | |
| 2010/0044619 A1* | 2/2010 | Hulse ...................... | C09K 3/30 252/67 |
| 2010/0122545 A1* | 5/2010 | Minor et al. ................. | 62/324.1 |
| 2010/0132400 A1* | 6/2010 | Sugiura ............................ | 62/500 |
| 2010/0193155 A1* | 8/2010 | Nakatani et al. ............... | 165/62 |
| 2010/0193156 A1* | 8/2010 | Nakatani et al. ............... | 165/63 |
| 2011/0011126 A1 | 1/2011 | Fujino et al. | |
| 2011/0186772 A1 | 8/2011 | Rached | |
| 2012/0144857 A1 | 6/2012 | Rached | |

FOREIGN PATENT DOCUMENTS

| | | | |
|---|---|---|---|
| CA | 2 674 256 | 1/2010 | |
| CA | 2 782 587 | 7/2011 | |
| JP | 2008-256314 | 10/2008 | |
| JP | 2009-222359 | 10/2009 | |
| JP | 2009-222360 | 10/2009 | |
| JP | 2009-222362 | 10/2009 | |
| JP | 2010-002074 | 1/2010 | |
| WO | 2005/105947 | 11/2005 | |
| WO | 2006/094303 | 9/2006 | |
| WO | 2010/002016 | 1/2010 | |
| WO | WO 2010002016 A1 * | 1/2010 | ............... C09K 5/04 |
| WO | 2010/040928 | 4/2010 | |
| WO | 2010/059677 | 5/2010 | |
| WO | 2011/030027 | 3/2011 | |

OTHER PUBLICATIONS

Machine Translation for Moriwaki et al. (JP 2009-222362) from JPO website.*
NPL—"Ejector Cycle" Denso—Nov. 20, 2008 https://web.archive.org/web/20081120004158/http://www.globaldenso.com/en/technology/product/airsupply/files/ejector_cycle_e.pdf.*
"Alternative Refrigerant Terminology"—Oct. 6, 2003 https://web.archive.org/web/20031006184930/http://refrigerants.com/terminology.htm.*
International Search Report dated Jun. 8, 2011 in International (PCT) Application No. PCT/JP2011/052194.
Written Opinion dated Jun. 8, 2011 in International (PCT) Application No. PCT/JP2011/052194.
Examination Report dated Sep. 2, 2013 in corresponding European Application No. 11 707 928.5.
Office Action dated Jul. 12, 2013 in corresponding Canadian Application No. 2,778,909.
"Performance Evaluation of Heat Exchanger using Zeotropic Refrigerant Mixture", Meeting of the Thermal Engineering Division of The Japan Society of Mechanical Engineers, No. 97-25, 1997, B134, with English Abstract.
W.F. Stoecker et al., "Refrigeration and Air Conditioning", Second Edition, 1982, pp. 236-237.
Reinhard Radermacher et al., "Vapor Compression Heat Pumps with Refrigerant Mixtures", 2005, pp. 135 and 142-145.
Shinban Kobunshi Jiten, 1991, pp. 193 and 474.

* cited by examiner

*Primary Examiner* — Jianying Atkisson
*Assistant Examiner* — Antonio R Febles
(74) *Attorney, Agent, or Firm* — Wenderoth, Lind & Ponack, L.L.P.

(57) ABSTRACT

An object of the present invention is to provide a refrigerant composition having a reduced amount of comprehensive environmental load, in which the refrigerant composition has low GWP (direct impact on global warming is low), and has good energy efficiency (indirect impact on global warming is low) when used in a device.
The present invention provides a refrigerant composition comprising 30 to 50 mass % of difluoromethane (HFC32) and 70 to 50 mass % of 2,3,3,3-tetrafluoropropene (HFO1234yf).

8 Claims, No Drawings

REFRIGERANT COMPOSITION COMPRISING DIFLUOROMETHANE (HFC32) AND 2,3,3,3-TETRAFLUOROPROPENE (HFO1234YF)

TECHNICAL FIELD

The present invention relates to a refrigerant composition comprising difluoromethane (HFC32) and 2,3,3,3-tetrafluoropropene (HFO1234yf), which is used in refrigeration units (air conditioners, refrigeration machines, etc.).

BACKGROUND ART

As the whole world has been discussing global warming as a serious problem, the importance of developing a refrigeration unit that has a low environmental load has increased. Refrigerants themselves have an impact on global warming and also greatly affect the performance of refrigeration units. Accordingly, the selection of a refrigerant plays an important role in reducing the generation of carbon dioxide, which is involved in global warming.

In recent years, various types of fluorinated propenes having a double bond in the molecule have been proposed. These fluorinated propenes have a lower global warming potential (GWP) compared to heretofore known chlorofluorocarbons (CFCs), hydrochlorofluorocarbons (HCFCs), and hydrofluorocarbons (HFCs).

One of them is 2,3,3,3-tetrafluoropropene (HFO1234yf) (Patent Literatures 1, 2, etc.). However, HFO1234yf has a drawback: the device performance cannot be ensured when HFO1234yf is used alone in conventional devices because HFO1234yf has a higher boiling point and a lower pressure compared to HCFC22, which has conventionally been used in floor standing type air conditioners, and non-ozone layer depleting R407C and R410A, which have subsequently been promoted as alternatives.

When selecting a refrigerant, while it is obviously important that the refrigerant itself has a low GWP (a direct impact on global warming), the energy use efficiency (an indirect impact on global warming) of a device that uses the refrigerant is equally or more important. In recent years, the annual performance factor (APF) has been used as a method for evaluating the energy efficiency of devices.

The APF is a numerical value determined by dividing the cooling and heating capacity required in one year if an air conditioner is used throughout the year by the amount of electricity consumed by the air conditioner in one year (the amount of electricity consumption over a specific period of time). The evaluation closely reflects actual use. An air conditioner having a higher APF achieves higher energy-saving performance, and a refrigerant thereof is considered to have a lower environmental load.

CITATION LIST

Patent Literature

PTL 1: WO Publication No. 2005/105947
PTL 2: WO Publication No. 2006/094303

SUMMARY OF INVENTION

Technical Problem

In recent years, refrigerants with lower GWPs have been proposed. However, when such a refrigerant is used in a vapor-compression refrigerant cycle device, if the device has a conventional structure, sufficient performance cannot be ensured due to the effect of pressure loss and the like because such a refrigerant has a higher boiling point and a lower operating pressure compared to conventionally used refrigerants. Accordingly, countermeasures such as increasing the device size and the like are required to ensure cooling and heating performance.

An object of the present invention is to provide a refrigerant composition having a reduced amount of comprehensive environmental load, in which the refrigerant composition has a low GWP (direct impact on global warming is low), and achieves good energy efficiency (indirect impact on global warming is low) when used in a device.

Solution to Problem

As a result of extensive studies in view of the above-described problem, the present inventors found that the above-described problem can be solved by employing a refrigerant composition comprising 30 to 50 mass % of difluoromethane (HFC32) and 70 to 50 mass % of 2,3,3,3-tetrafluoropropene (HFO1234yf).

Specifically, the present invention relates to the refrigerant composition described below.

Item 1. A refrigerant composition comprising 30 to 50 mass % of difluoromethane (HFC32) and 70 to 50 mass % of 2, 3, 3, 3-tetrafluoropropene (HFO1234yf).

Item 2. The refrigerant composition according to Item 1, comprising 35 to 45 mass % of difluoromethane (HFC32) and 65 to 55 mass % of 2,3,3,3-tetrafluoropropene (HFO1234yf).

Item 3. The refrigerant composition according to Item 1 or 2 further comprising a polymerization inhibitor.

Item 4. The refrigerant composition according to Item 1 or 2 further comprising a stabilizer.

Item 5. The refrigerant composition according to Item 1 or 2 further comprising refrigerant oil.

Item 6. The refrigerant composition according to any one of Items 1 to 5, wherein the refrigerant composition is used in a refrigeration unit provided with a countermeasure to prevent heat exchange efficiency from decreasing due to the temperature glide in a heat exchanger.

Item 7. The refrigerant composition according to Item 6, wherein the refrigerant composition is used in the refrigeration unit further provided with a countermeasure to reduce the effect of pressure loss.

Item 8. The refrigerant composition according to Item 6, wherein the countermeasure to prevent heat exchange efficiency from decreasing due to the temperature glide in a heat exchanger is at least one of the following: eliminating the temperature difference between air and refrigerant by countercurrent flow, preventing frost formation near the inlet of an evaporator, and increasing the heat-transfer coefficient of a heat exchanger.

Item 9. The refrigerant composition according to Item 7, wherein the countermeasure to reduce the effect of pressure loss is at least one of the following: increasing the tube diameter of a heat exchanger and/or optimizing the number of paths in a heat exchanger, increasing the pipe diameter and/or shortening the length of a pipe in an air conditioner and a connecting pipe for an air conditioner; using an ejector as an expansion mechanism; and using an economizer cycle.

Advantageous Effects of Invention

The refrigerant composition of the present invention achieves the following effects.

(1) The refrigerant composition has a lower GWP than that of R407C and R410A, which have been heretofore used.
(2) The refrigerant composition has zero ozone depletion potential (ODP), and is not involved in the destruction of the ozone layer even when the refrigerant composition is not completely recovered after use.
(3) The refrigerant composition has a high APF, particularly when used in an air conditioner provided with a countermeasure to prevent the heat exchange efficiency from decreasing due to the temperature glide in a heat exchanger. Specifically, an air conditioner that uses the refrigerant composition of the present invention exhibits energy efficiency that is equal to or more than that of an air conditioner that uses R407C and R410A, which have been heretofore used.

DESCRIPTION OF EMBODIMENTS

The present inventors evaluated, based on the APF, how the performance of a mixed refrigerant of HFC32 and HFO1234yf changes depending on the mixing ratio of HFC32. Note that the APF of an air conditioner that uses R410A was used as a standard for evaluation.

When HFO1234yf was used alone, the result showed an APF that is 80% of the standard. A reason therefore may be that it was necessary to increase operation frequency because HFO1234yf has a low cooling capacity per unit flow rate, and the increased flow rate resulted in an increase in the pressure loss. An additional reason may be that the evaporation temperature of HFO1234yf was reduced because of a greater effect of pressure loss caused by the reduced evaporation pressure of HFO1234yf, which is a result of its high boiling point. In this regard, it was predicted that adding HFC32, which has a lower boiling point and a higher pressure than HFO1234yf, to HFO1234yf would raise the pressure of the refrigerant and increase the APF.

However, adding HFC32 yielded astonishing results: an addition of 10 mass % of HFC32 actually resulted in a lower APF, compared to when HFO1234yf was used alone. Then, the proportion of HFC32 was further increased. When 30 mass % of HFC32 was added, the APF finally reached a value equal to that obtained when HFO1234yf is used alone. The APF increased when further HFC32 was added. When 60 mass % of HFC32 was added, the APF reached 93% of the standard.

Although HFC32 has a lower GWP (675) compared to R410A (2075), the GWP of HFC32 is still high. On the other hand, HFO1234yf has a low GWP (4). Accordingly, when a mixed refrigerant of HFC32 and HFO1234yf is used as an alternative refrigerant to R410A, instead of adding 60 mass % or more of HFC32 to the mixture, it is preferable to reduce the HFC32 content as much as possible.

The flammability of refrigerant compositions is another aspect to consider. Although both HFC32 and HFO1234yf are refrigerants that exhibit very low flammability, the flammability of HFC32 is higher. When indicated with an RF number, which is an index of flammability, HFC32 has a value of 4.0 kJ/g, and HFO1234yf has a value of 3.4 kJ/g. Further, when compared in terms of flame propagation velocity, HFO1234yf has a value of 1.2 cm/sec whereas HFC32 has a value of 6.7 cm/sec. HFC32 has a higher flammability. Accordingly, a lower proportion of HFC32 is advantageous also in terms of flammability.

Adding HFC32 to HFO1234yf increases the pressure of the mixed refrigerant. Accordingly, the fact that HFC32 and HFO1234yf are zeotropic may be the reason why adding HFC32 temporarily reduces the APF. To alleviate the problem in which the APF is reduced by zeotropic behavior, it is necessary to provide a countermeasure to a refrigeration unit to prevent the heat exchange efficiency from decreasing due to the temperature glide in a heat exchanger.

At least one of the following is used as the above countermeasure: (1) eliminating the temperature difference between air and refrigerant by countercurrent flow; (2) preventing frost formation near the inlet of an evaporator; and (3) increasing the heat-transfer coefficient of a heat exchanger. Examples of (1) include allowing cooling and heating flows to be countercurrent to each other in a heat exchanger. Further, examples of (2) include providing defrosting means near the inlet of an evaporator. Further, examples of (3) include using a high-performance heat transfer tube.

When a mixed refrigerant of HFC32 and HFO1234yf was used in a refrigeration unit provided with at least one of the above-described countermeasures, 95% of the standard APF was attained when 30 mass % of HFC32 was added to the mixture; 100% of the standard APF was attained when 40 mass % of HFC32 was added to the mixture; and 102% of the standard APF was attained when 50 mass % of HFC32 was added to the mixture. Specifically, it was found that, with the use of a refrigerant composition comprising 30 to 50 mass % of HFC32 and 70 to 50 mass % of HFO1234yf, a refrigeration unit provided with at least one of the above-described countermeasures can achieve the same level of performance as that obtained when R410A is used.

A refrigeration unit provided with at least one of the above-described countermeasures may be further provided with a countermeasure to reduce the effect of pressure loss. At least one of the following is used as the above countermeasure: (A) increasing the tube diameter of a heat exchanger and/or optimizing the number of paths in a heat exchanger, (B) increasing the pipe diameter and/or shortening the length of a pipe in an air conditioner and a connecting pipe for an air conditioner, (C) using an ejector as an expansion mechanism, and D) using an economizer cycle. Examples of (A) include increasing the size of a compressor.

Specific examples of these countermeasures (modifications) are described in, for example, Japanese Unexamined Patent Publication No. 2009-222362, Japanese Unexamined Patent Publication No. 2009-222360, and Japanese Unexamined Patent Publication No. 2009-222359.

At the same time, even when HFO1234yf is used alone, the APF thereof can be increased by modifying a refrigeration unit in the above-describe manner. For example, the APF was increased by about 10% by the countermeasure that reduces the effect of pressure loss, and further increased by about 5% by the countermeasure that appropriately adjusts the compressor. In this way, about 95% of the standard APF is attained even when HFO1234yf is used alone; however, the extent of these modifications is not practical in the case when HFO1234yf is used alone.

The present invention proposes a refrigerant composition comprising 30 to 50 mass % of HFC32 and 70 to 50 mass % of HFO1234yf as a refrigerant for obtaining, in a range of practical modifications, an APF equivalent to that obtained by the use of R410A. When the mixing ratio is within the above-described ranges, it is possible to reduce the flammability and the GWP while maintaining an APF equivalent to that obtained by the use of R410A. Preferably, the refrigerant composition of the present invention comprises 35 to 45 mass % of HFC32 and 65 to 55 mass % of HFO1234yf, more preferably, 35 to 40 mass % of HFC32 and 65 to 60 mass % of HFO1234yf.

The refrigerant composition of the present invention exhibits a high stability. When a high level of stability is required under severe conditions, a stabilizer may be added, if necessary, to the refrigerant composition.

Examples of stabilizers include (i) aliphatic nitro compounds such as nitromethane, nitroethane, etc.; aromatic nitro compounds such as nitrobenzene, nitrostyrene, etc.; (ii) ethers such as 1,4-dioxane, etc. ; amines such as 2,2,3,3,3-pentafluoropropylamine, diphenylamine, etc.; and butylhydroxyxylene, benzotriazole, etc. The stabilizers may be used alone or in combination of two or more.

Although the amount of stabilizer used varies depending on the type used, it is within a range that does not impair the properties of the refrigerant composition. The amount of stabilizer used is usually preferably about 0.01 to 5 parts by weight, more preferably 0.05 to 2 parts by weight, relative to 100 parts by weight of a mixture of HFC32 and HFO1234yf.

The refrigerant composition of the present invention may further comprise a polymerization inhibitor. Examples of polymerization inhibitors include 4-methoxy-1-naphthol, hydroquinone, hydroquinone methyl ether, dimethyl-t-butylphenol, 2,6-di-tert-butyl-p-cresol, benzotriazole, etc.

The amount of polymerization inhibitors used is usually preferably 0.01 to 5 parts by weight, more preferably 0.05 to 2 parts by weight, relative to 100 parts by weight of a mixture of HFC32 and HFO1234yf.

The refrigerant composition of the present invention may further contain refrigerant oil. Examples of refrigerant oil include, but are not limited to, polyalkylene glycol, polyol ester, polyvinyl ether, alkyl benzene, mineral oil, etc.

Examples of refrigeration units in which the refrigerant composition of the present invention is used include, but are not limited to, air conditioners for industrial use and home use (which are not only limited to separate type air conditioners in which a single or multiple indoor units and outdoor units are interconnected by a refrigerant pipe, but may also include window type and portable type air conditioners in which a casing integrally houses a refrigerant circuit, and roof top type and central type air conditioners in which cold air and warm air are conveyed through a duct), car air conditioners, heat pumps for automatic vending machines, refrigerators, refrigeration machines for cooling the inside of containers for marine shipping and the like, chiller units, turbo refrigeration machines, etc.

The refrigerant composition of the present invention can also be used in apparatuses exclusively used for the heating cycle such as water heating devices, floor heating devices, snow-melting devices, and the like. The refrigerant composition is particularly useful as a refrigerant composition in devices for which size reduction is demanded, such as air conditioners for industrial use and home use, car air conditioners, heat pumps for automatic vending machines, refrigerators, and chiller units.

As described above, these refrigeration units are preferably provided with a countermeasure to prevent the heat exchange efficiency from decreasing due to the temperature glide in a heat exchanger.

Specific examples of refrigeration units and heat exchangers include devices disclosed in claims 1 and 6 of Japanese Unexamined Patent Publication No. 2009-222362. Examples of heat exchangers include a heat exchanger disclosed in claim 1 of Japanese Unexamined Patent Publication No. 2009-222360. Further, examples of refrigeration units include a refrigeration unit disclosed in claim 1 of Japanese Unexamined Patent Publication No. 2009-222359, and a refrigeration unit disclosed in claim 1 of Japanese Unexamined Patent Publication No. 2009-222357.

EXAMPLES

Hereinbelow, the present invention is described using examples, but is not limited thereto.

A performance test was conducted in accordance with JIS-C9612 by installing an air conditioner in a calorimeter test chamber approved by JIS. Specifically, the following values were measured:

(1) amount of air-side heat exchange in an indoor unit, (2) input power of a compressor, (3) input power of fans in indoor and outdoor units, (4) input current of a four-way switching valve, (5) input current of an electric expansion valve, and (6) input current of a compressor. Then, the coefficient of performance (COP) during each of the following operations was determined: rated cooling operation (4 kW), mid-capacity cooling operation (2 kW), rated heating operation (5 kW), and mid-capacity heating operation (2.5 kW). Further, the APF was determined.

Table 1 shows the refrigerant compositions used, the specifications of the air conditioners used, and the APF values obtained. Table 1 also shows ratios obtained by comparing each APF with the APF of Comparative Example 1.

TABLE 1

|  | Refrigerant Composition | Air Conditioner Specifications | APF | |
| --- | --- | --- | --- | --- |
| Comparative Example 1 | R410A | Standard unit for R410A | 5.99 | 100% |
| Comparative Example 2 | HFO1234yf | Standard unit for R410A | 4.80 | 80.1% |
| Comparative Example 3 | HFC32/HFO1234yf (10/90 mass %) | Standard unit for R410A | 4.75 | 79.3% |
| Example 1 | HFC32/HFO1234yf (50/50 mass %) | Standard unit for R410A | 5.36 | 89.5% |
| Example 2 | HFC32/HFO1234yf (40/60 mass %) | Standard unit for R410A | 5.27 | 88.0% |
| Example 3 | HFC32/HFO1234yf (50/50 mass %) | Specifications including a countermeasure for temperature glide | 6.10 | 102% |
| Example 4 | HFC32/HFO1234yf (40/60 mass %) | Specifications including a countermeasure for temperature glide | 6.00 | 100% |
| Example 5 | HFC32/HFO1234yf (40/60 mass %) | Specifications including countermeasures for temperature glide + pressure loss | 6.11 | 102% |

Specifications including a countermeasure for temperature glide: modified specifications in which a switching valve is provided to a standard unit for R410A so as to allow refrigerant and air to flow entirely in a countercurrent manner in indoor and outdoor heat exchangers during a cooling operation mode and a heating operation mode.
Specifications including a countermeasure for pressure loss: specifications in which a dry valve is removed from an indoor heat exchanger of a standard unit for R410A, and the size of a gas-side connecting pipe is changed from ⅜-inch to ⅝-inch.

INDUSTRIAL APPLICABILITY

The present invention is useful as a refrigerant composition for refrigeration units such as air conditioners, refrigeration machines, and the like.

The invention claimed is:
1. A refrigeration unit comprising:
(a) a countermeasure to prevent heat exchange efficiency from decreasing due to a temperature glide in a heat exchanger; and

(b) a refrigerant composition comprising a refrigerant mixture, the refrigerant mixture consisting essentially of 30 to 35 mass % of difluoromethane (HFC32) and 70 to 65 mass % of 2,3,3,3-tetrafluoropropene (HFO1234yf), based on a total of HFC32 and HFO1234yf in the refrigerant composition wherein the total amount of HFC32 and HFO1234yf is taken as 100 mass %.

2. The refrigeration unit according to claim 1, wherein the refrigeration unit is further provided with a countermeasure to reduce an effect of pressure loss.

3. The refrigeration unit according to claim 1, wherein the countermeasure to prevent heat exchange efficiency from decreasing due to the temperature glide in a heat exchanger is at least one of the following: eliminating a temperature difference between air and refrigerant by countercurrent flow, preventing frost formation near an inlet of an evaporator, and increasing a heat-transfer coefficient of a heat exchanger.

4. The refrigeration unit according to claim 2, wherein the countermeasure to reduce the effect of pressure loss is at least one of the following: increasing a tube diameter of a heat exchanger or optimizing a number of paths in a heat exchanger, increasing a pipe diameter or shortening a length of a pipe in an air conditioner and a connecting pipe for an air conditioner, using an ejector as an expansion mechanism, and using an economizer cycle.

5. A method for operating a refrigeration unit, comprising causing a refrigerant composition comprising a refrigerant mixture, the refrigerant mixture consisting essentially of 30 to 35 mass % of difluoromethane (HFC32) and 70 to 65 mass % of 2,3,3,3-tetrafluoropropene (HFO1234yf), based on a total of HFC32 and HFO1234yf in the refrigerant composition, to flow in a refrigeration unit provided with a countermeasure to prevent heat exchange efficiency from decreasing due to a temperature glide in a heat exchanger.

6. The method for operating a refrigeration unit according to claim 5, wherein the refrigeration unit is further provided with a countermeasure to reduce an effect of pressure loss.

7. The method for operating a refrigeration unit according to claim 5, wherein the countermeasure to prevent heat exchange efficiency from decreasing due to the temperature glide in a heat exchanger is at least one of the following: eliminating a temperature difference between air and refrigerant by countercurrent flow, preventing frost formation near an inlet of an evaporator, and increasing a heat-transfer coefficient of a heat exchanger.

8. The method for operating a refrigeration unit according to claim 6, wherein the countermeasure to reduce the effect of pressure loss is at least one of the following: increasing a tube diameter of a heat exchanger or optimizing a number of paths in a heat exchanger, increasing a pipe diameter or shortening a length of a pipe in an air conditioner and a connecting pipe for an air conditioner, using an ejector as an expansion mechanism, and using an economizer cycle.

\* \* \* \* \*